Figure 1:
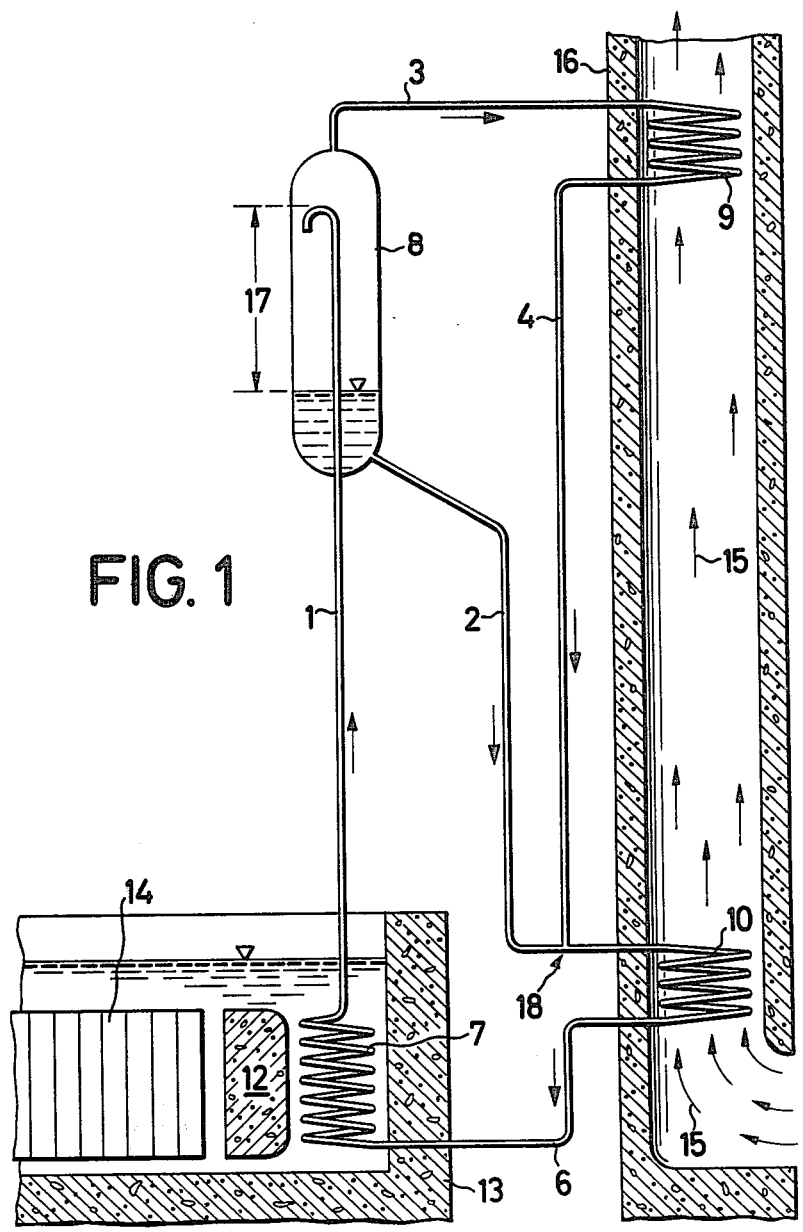

United States Patent [19]

Hesky et al.

[11] 4,404,165
[45] Sep. 13, 1983

[54] PROCESS FOR CARRYING AWAY THE DECAY HEAT OF RADIOACTIVE SUBSTANCES

[75] Inventors: Hans Hesky, Runkel; Armin Wunderer, Hofheim, both of Fed. Rep. of Germany

[73] Assignee: Hoechst Aktiengesellschaft, Frankfurt am Main, Fed. Rep. of Germany

[21] Appl. No.: 253,806

[22] Filed: Apr. 13, 1981

[30] Foreign Application Priority Data

Apr. 15, 1980 [DE] Fed. Rep. of Germany ....... 3014289

[51] Int. Cl.³ .............................................. G21C 15/00
[52] U.S. Cl. ..................................... 376/272; 376/298; 376/307; 376/369; 376/371; 250/506.1; 60/649; 60/651; 60/670
[58] Field of Search ............... 376/298, 299, 272, 369, 376/307, 371; 60/649, 670, 651; 250/506.1, 507.1

[56] References Cited

U.S. PATENT DOCUMENTS

| | | | |
|---|---|---|---|
| 3,089,840 | 5/1963 | Carter et al. | 376/369 |
| 3,253,999 | 5/1966 | Weisman | 376/371 |
| 3,358,451 | 12/1967 | Feldman et al. | 60/649 |
| 3,393,127 | 7/1968 | Detman et al. | 376/272 |
| 3,506,539 | 4/1970 | Rigg | 376/298 |
| 3,607,634 | 9/1971 | Gerard et al. | 376/307 |
| 3,817,321 | 6/1974 | von Cube et al. | |
| 3,866,424 | 2/1975 | Busey | 376/298 |
| 4,187,433 | 2/1980 | Zezza | 376/272 |
| 4,195,485 | 4/1980 | Brinkerhoff | 60/649 |
| 4,288,997 | 9/1981 | Friesen et al. | 376/272 |
| 4,295,335 | 10/1981 | Brinkerhoff | 60/649 |

*Primary Examiner*—Harvey E. Behrend
*Attorney, Agent, or Firm*—Curtis, Morris & Safford

[57] ABSTRACT

In this process, the decay heat of radioactive substances is carried away by circulating liquid coolant. Some of the liquid coolant is vaporized by the decay heat. The circulation of liquid in the circuit is driven by pressure from the vapor. After exceeding a static pressure head corresponding to the pressure drop in the circuit, the vapor is separated from the liquid and condensed, and the condensate is combined with the liquid returning for repeated partial vaporization.

15 Claims, 2 Drawing Figures

PROCESS FOR CARRYING AWAY THE DECAY HEAT OF RADIOACTIVE SUBSTANCES

The subject of the invention is a process for carrying away the decay heat of radioactive substances by means of a circulating liquid.

It is known to employ indirect cooling to carry away the heat which is produced in the storage of spent nuclear fuels, or in the storage of their daughter products which arise in processing. Analogously, the same method is applicable, in nuclear power stations, to the space in which spent fuel is placed, and to the safety space surrounding same. The known cooling methods have the disadvantage of being dependent on energy sources which are susceptible to failure, these energy sources being required for operating the necessary pumps, compressors, fans and regulating units.

The object of the present invention is accordingly to provide a process by which the decay heat of radioactive substances can be carried away by an inherent mechanism, that is to say without using items of equipment having moving parts, such as pumps, fans, compressors, regulating units etc.

The object is achieved by a process wherein some of a circulating liquid is vaporized by the decay heat and the liquid in the circuit is driven by the mixture of liquid and vapor which has formed, and after exceeding a static head corresponding to the pressure drop in the circuit, the mixture of liquid and vapor is separated into liquid and vapor, the vapor is condensed, and the condensate is combined with the liquid which has been separated off and is recycled for repeated partial vaporization.

It can be advantageous to cool the recycled liquid before some of it is vaporized. Some of the condensed vapor can be vaporized again before being recycled, that is to say, before being combined with the liquid in the circuit, the vapor being introduced into the liquid by means of inert carrier gas. A portion of the vapor can also be separated from the inert carrier gas by scrubbing the vapor-laden stream of inert carrier gas, using the liquid, and the other portion can be separated by subsequently cooling the inert carrier gas. The inert carrier gas, which has been stripped of vapor, is fed back to the vaporization stage in order to be charged with vapor.

A mixture of liquids having different boiling points can be used as the fluid for the circuit. In particular, the liquid components of the mixture should be such that on being mixed with one another they alter the temperature of the liquid.

Figure 2:
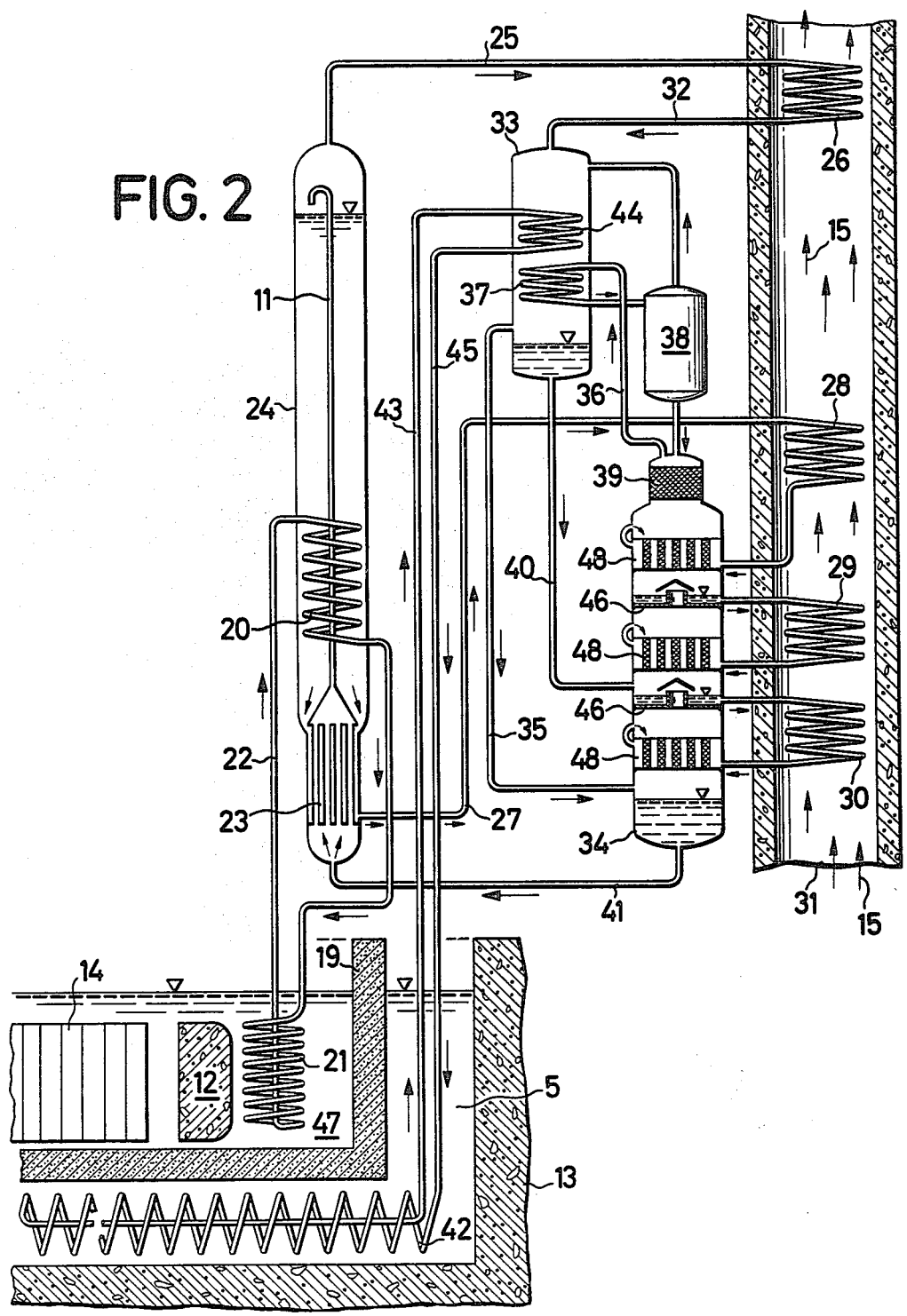

In the text which follows, the invention is explained in greater detail by reference to drawings which illustrate only one possible embodiment, and in which FIG. 1 shows the cooling, by an inherent mechanism, of an intermediate storage installation for nuclear fuel elements, FIG. 2 shows the cooling, by an inherent mechanism, of an intermediate storage installation for nuclear fuel elements, in which the container wall should be kept at a temperature very much lower, for example 20° C., than the contents of the storage installation.

The circuit for the liquid is formed essentially by the heat exchanger (7), the riser-pipe (1), the liquid separator (8), and the downpipes (2) and (6). The height difference (17) between the end of the riser-pipe (1) and the level of the liquid in the liquid separator (8) is adjustable. The fuel elements (14) are stored, in water, in the container (13). The water serves, inter alia, as a storage medium for the decay heat. The heat exchanger (7) can be located in the container (13) and is protected from radioactive radiation by a shield (12), by means of which possible radiolytic decomposition of the circulating liquid is avoided.

In the heat exchanger (7), the liquid is heated by the decay heat, and some of it is vaporized. The vapor is used as a medium for driving the liquid. The greater the cross-section of the riser-pipe (1) which is subjected to vapor, the greater is the conveying effect of the vapor. Since liquid and vapor are conveyed together, both the sensible heat of the liquid and the latent heat of vaporization contribute to the heat transport. Compared to pure thermo-syphon operation, less liquid has to be circulated to carry away the same quantities of heat. If, for example, aqueous ammonia solution is used as the liquid, the latent heat of separation is further added to the latent heat of vaporization and this leads to an additional reduction in the quantity to be circulated. The relation between the boiling range and the pressure can, to a considerable extent, be freely decided by selecting an appropriate mixing ratio.

The mixture of liquid and vapor thus rises in the riser-pipe (1) and enters the liquid separator (8), where vapor and liquid are separated. The driving-vapor, which is separated off, is condensed in the condenser (9), which is connected to the separator (8) by the line (3), and the condensate is introduced, via the line (4), into the liquid which is flowing from the liquid separator (8), via the downpipes (2) and (6), to the heat exchanger (7). It can be advantageous to locate a cooler (10) in the downpipe (6), especially if the temperature alters as a result of introducing and mixing the condensate with the liquid. In this case, the cooler (10) and the condenser (9) can be located in a kind of chimney (16). A natural draught is set up in the chimney, due to the release of heat by the condenser and the cooler to the air. The condenser (9) can be placed lower, in order to increase the draught action in the chimney (16). In order to prevent the condenser (9), which is placed lower, from being flooded via the line (4), a fluid entrainment pump can be located in the line (2) at the position (18). When this system is operated with a two-component mixture, the component of the mixture having the lower boiling point thus flows, via line (4), into the liquid of line (2) at the position (18). Heat of mixing can thereby be released at the position (18). A temperature increase of this kind enhances the heat transfer in the cooler (10) to the air stream (15).

The height difference (17) between the circulation in the riser-pipe (1) and the liquid level in the liquid separator (8) can be adjusted. By this means, it is possible to set the temperature in the storage container, at which, once reached the container is to be cooled. Only when the generation of vapor in the heat exchanger (7) is sufficiently great to overcome the height difference (17) can the circulation of liquid take place. In this regard, it can be expedient to feed in a certain quantity of inert gas at that point in order to achieve more abrupt suppression of the circulation below a desired temperature.

The decay heat which arises in the storage of fuel elements can be carried away by means of a system according to FIG. 2, which has a capacity, for example, of 1 MW and operates at 5 bars. Under these conditions, the water which is in direct contact with the fuel elements is to be kept at a temperature of approximately 65° C., whilst the container wall (13), which is separated from this water by a thermally insulating diaphragm (19), is to be kept at a temperature of approximately 30° C. The heat which passes through a thermally insulating covering of the warm water surface and into the space surrounding the storage container, for example into the storage hall, can also be carried away by the same process.

In the case of this example, the container (13) is subdivided by a diaphragm (19), made of glass wool or similar material, into a first space (47) containing the fuel elements (14) and into a second space (5) which surrounds the first space (47). The diaphragm (19) enables the water level to equalise on both sides of the diaphragm, but prevents turbulent flow of the water from space (47) to space (5) and thus acts as thermal insulation.

Through thermosyphon action, heat is carried away, by means of a heat transfer liquid, from the warmer part of the fuel element storage installation, at a rate Qw of 0.63 MW, and, by means of indirect heat exchange in the heat exchanger (20), is used for vaporizing some of the liquid and for driving a mammoth pump (11). The heat transfer liquid, for example water, is heated to 63° C. by the decay heat, via the heat exchanger (21), and enters the heat exchanger (20) via the riser-pipe (22). The heat exchanger (20) is part of a bubble-stripping column (24). The liquid, a two-component mixture (for example ammonia/water), is heated to 60° C. by contact with the heat exchangers (20) and (23) and some of it (approx. 10%) is vaporized. The vapor drives the mammoth pump (11). The liquid is separated off again at the head of the bubble-stripping column and the vapor, which is the component having the lower boiling point, is fed to the condenser (26) via the line (25). After passing through the heat exchangers (20) and (23), the liquid, depleted to 35% $NH_3$ in the component having the lower boiling point, leaves the bubble-stripping column (24) and thence enters the air heat exchanger (28) of the chimney (31) via the line (27).

The condensate, which leaves the condenser (26) at 1.330 tonnes/h and contains 99% $NH_3$, enters, via the line (32), a vaporizer (33), where it is brought into contact, in a suitable form, with a stream of a light carrier gas, for example hydrogen or helium, which is being circulated at, for example, 440 $Nm^3$/h, via an absorber column (34). In the vaporizer (33), approximately 97% of the component having the lower boiling point vaporizes and mixes with the carrier gas, so that a mixture having a higher density is formed, which enters the other part of the absorber column (34) via the down-pipe (35). In the absorber column (34), the carrier gas is scrubbed, using the liquid which is leaving the bubble-stripping column (24).

From the air cooler (28), the liquid, which is depleted in the component having the lower boiling point, enters (11.8 tonnes/h) the absorber column (34), in which it is brought into contact, in a suitable manner, via the internal fittings (48), with the carrier gas which is flowing in counter-current. At this stage, the depleted liquid takes up the component having the lower boiling point from the carrier gas, in a known manner, whereupon the carrier gas, relieved of the said component, becomes lighter and flows back to the vaporizer (33) through the line (36). In said vaporizer, the carrier gas enters into indirect heat exchange, via the exchanger surfaces (37), with a downward-flowing mixture of carrier gas, enriched in the component having the lower boiling point, and liquid remnants of the condensate, which is enriched in the component having the higher boiling point. In counter-current to this flow, the carrier gas is further cooled in the exchanger (37), so that the major part of the residual vapor of the mixture (160 kg/h), still contained in the carrier gas, now condenses out. The condensed residual vapor is separated off in the separator (38) and flows, as reflux, to a packing (39), where it comes, in counter-current to the carrier gas, into direct exchange with the carrier gas which is leaving at the head of the absorber (34). Exchange of heat and of material is thereby effected, the latter exchange reducing the concentration of vapor of the component having the higher boiling point in proportion to the vapor of the component having the lower boiling point, and thus ensures that the major part of the condensate vaporizes in the vaporizer (33), this degree of vaporization considerably increasing the efficiency of the system. The remainder of the condensate from the vaporizer (33) is fed, via the line (40), to the absorber (34), at a suitable point. The liquid, the two-component mixture (13.2 tonnes/h, with 41% $NH_3$), leaves the absorber column (34) via the line (41) and enters the bubble-stripping column (24). In addition to the air heat exchanger (28), additional air heat exchangers (29) and (30) can be arranged in the liquid circuit. Intermediate trays for the liquid are indicated at (46).

The heat of vaporization required for the vaporizer (33) can be derived from the space (5), into which 0.37 MW of decay heat has penetrated via the thermal insulation. For this purpose, a heat exchanger (42) is installed in the space (5). From this heat exchanger, the heat transfer medium enters the heat exchanger (44) of the vaporizer (33), via the line (43). The return flow takes place via the line (45). As illustrated in FIG. 1, this heat transport can be regulated by means of a mammoth pump having a height difference. If desired, the heat transport from the space (5) to the vaporizer (33) can largely be brought to a standstill by this means. The vapors from the bubble-stripping column (24), which have been condensed in the condenser (26), pass through the vaporizer (33) virtually without any reduction, temperatures being set up there at which the carrier gas which is only lightly charged has the same density as the carrier gas from the absorber, which is then certainly warmer but is also more heavily charged, with the result that the carrier circulation similarly comes to a standstill. Virtually all the condensate runs, via the line (40), to the absorber column, so that an operating state, corresponding completely to the mode of operation according to FIG. 1, is established. The heat is carried away solely from the warm zone (space 47).

We claim:

1. Process for carrying away decay heat of a radioactive substance contained in a storage container by means of a circulating liquid in a closed loop comprising
absorbing said decay heat by heat exchanger means in thermal communication with said radioactive substance;
vaporizing a portion of said liquid into a vapor;
receiving said liquid and said vapor and separating the same into respective phases in separator means including a chamber in which the separated liquid reposes at a liquid level, said liquid and vapor entering the chamber through an adjustable vertical riser conduit coupled with said heat exchanger means and extending an adjustable distance within said chamber for an adjustable height difference above said liquid level, the heat exchanger and riser conduit acting in concert to drive the circulation of said liquid and vapor by percolator pump action, with the height difference corresponding to the pressure drop in the closed loop;

receiving in condenser means the separated vapor from said separator means;

condensing said vapor to liquid phas by removal of heat therefrom;

combining in return conduit means the separated liquid from said separator means and the condensation liquid from said condenser means; and returning the combined liquid to said heat exchanger means.

2. Process for carrying away decay heat as claimed in claim 1, wherein the step of combining the separated liquid and the condensation liquid in return conduit means includes removing heat, in cooler means, from said separated liquid prior to return thereof to said heat exchanger means.

3. Process for carrying away decay heat as claimed in claim 2, wherein said cooler means includes an air-liquid heat exchanger, chimney means are provided, within which said air-liquid heat exchanger is disposed, and said step of removing heat includes creating a natural air draft in said chimney means by heat from said liquid to cool the liquid in said air-liquid heat exchanger.

4. Process for carrying away decay heat as claimed in claim 3, wherein said condenser means is also disposed in said chimney means to condense said separated vapor by means of said natural air draft.

5. Process for carrying away decay heat as claimed in claim 1, wherein said height difference of said riser conduit above said liquid level is adjustable to correspond with a desired temperature of the storage container containing said radioactive substance.

6. Process for carrying away decay heat as claimed in claim 1, further comprising, following said step of condensing in said condenser means, reevaporating into a vapor in evaporator means a part of the condensation liquid, mixing the resulting vapor with an inert carrier gas, combining by absorption in absorber means the resulting vapor and the separated liquid, and separating the carrier gas to be recycled to said evaporator means.

7. Process for carrying away decay heat as claimed in claim 6, wherein the step of combining in said absorber means includes scrubbing the vapor-laden inert carrier gas by contacting the same with said separated liquid.

8. Process for carrying away decay heat as claimed in claim 7, further comprising after said separating the carrier gas, cooling the inert carrier gas in gas cooling means after the carrier gas has been scrubbed in said absorber means, to separate further vapor from the carrier gas before the same is returned to the vaporizer means.

9. Process for carrying away decay heat as claimed in claim 6, wherein said circulating liquid is a mixture of liquids having different boiling points, and said carrier gas is selected from a group consisting of hydrogen and helium.

10. Process for carrying away decay heat as claimed in claim 1, wherein said circulating liquid is a mixture of liquid components having different boiling points.

11. Process for carrying away decay heat as claimed in claim 10, wherein said liquid components upon mixture with one another have a heat of absorption which lowers the temperature of the resulting mixture.

12. Process for carrying away decay heat as claimed in claim 1, further comprising preventing radiolysis of the circulating liquid by shield means disposed in said storage container between said radioactive substance and said heat exchanger means.

13. Cooling arrangement for carrying away decay heat of a radioactive substance stored in a container, where the container is partitioned such that an inner part thereof in which the radioactive substance is stored is at one temperature and an outer part thereof in contact with walls of the container is at a lower temperature, comprising first heat exchanger means in thermal communication with said inner part for carrying said decay heat therefrom; separator pump means including a stripping column containing a mixture of liquid components of different boiling points and a pump pipe within said column rising to a height difference above a liquid level in said column, said first heat exchanger means having a portion disposed within said column for heating said mixture, to cause vaporization of a part of the liquid component having the lower boiling point, the pipe pumping the liquid mixture and the separated vapor into said column; a condenser coupled to said column to cool and condense said separated vapor; a vaporizer to receiver the condensation liquid from the condenser; second heat exchanger means in thermal communication with said outer part and with said vaporizer to transfer heat from the outer part to the condensation liquid from the condenser; and an absorber column following said vaporizer having liquid inlets to receive separated liquid from said stripping column and to receive condensation liquid from said vaporizer, a gas inlet to receive vapor from said vaporizer, and an outlet to recycle the combined liquid mixture to said stripping column.

14. Cooling arrangement as claimed in claim 13, further comprising heat exchanging means disposed at a lower end of said stripping column in which the combined liquid mixture is supplied from said liquid outlet to said pump pipe to absorb heat from said separated liquid flowing from said stripping column to said absorber column.

15. Cooling arrangement as claimed in claim 13, wherein said vaporizer and said absorber column contain a carrier gas substantially lighter than the vapor of the lower-boiling-point liquid.

* * * * *